United States Patent [19]

Komiyama et al.

[11] Patent Number: 5,282,878
[45] Date of Patent: Feb. 1, 1994

[54] APPARATUS FOR MOLDING OPTICAL GLASS ELEMENTS

[75] Inventors: Yoshizo Komiyama, Gotenba; Fumio Arai, Numazu; Yoshiyasu Toyama, Numazu; Yutaka Hasegawa, Numazu; Tetsuya Tanioka, Numazu, all of Japan

[73] Assignee: Toshiba Kikai Kabushiki Kaisha, Tokyo, Japan

[21] Appl. No.: 875,256

[22] Filed: Apr. 27, 1992

[30] Foreign Application Priority Data

Apr. 30, 1991 [JP] Japan .................. 3-126786

[51] Int. Cl.$^5$ ........................... C03B 23/00
[52] U.S. Cl. ........................... 65/162; 65/29; 65/64; 65/102; 65/157
[58] Field of Search .............. 65/29, 102, 162, 64, 65/32.1, 157, 319

[56] References Cited

U.S. PATENT DOCUMENTS

| 4,591,373 | 5/1986 | Sato ................................. 65/29 |
| 4,778,505 | 10/1988 | Hirota et al. ........................ 65/102 |
| 4,913,718 | 4/1990 | Yoshimura et al. .............. 65/162 X |
| 5,032,159 | 7/1991 | Kuwabara et al. .................... 65/64 |

OTHER PUBLICATIONS

Masaaki Yokota, "Method for Pressure Molding Optical Element", Japanese Patent Publication No. 216929/1987 Sep. 24, 1987.

*Primary Examiner*—Robert L. Lindsay
*Attorney, Agent, or Firm*—Cushman, Darby & Cushman

[57] ABSTRACT

The apparatus for molding an optical glass element is made up of relatively movable upper and lower molds for press molding a glass blank, and a plurality of infrared ray lamps encircling the upper and lower molds, temperature measuring devices for measuring the temperatures of the upper and lower molds, and a controller responsive to the outputs of the temperature measuring devices for controlling electric inputs to the infrared ray lamps thereby maintaining the temperatures of the upper and lower molds at predetermined values.

4 Claims, 2 Drawing Sheets

APPARATUS FOR MOLDING OPTICAL GLASS ELEMENTS

BACKGROUND OF THE INVENTION

This invention relates to a method and apparatus for molding such optical glass elements as a glass lens, a prism, etc., for example, and more particularly a method and apparatus for molding glass elements wherein a glass blank is disposed between upper and lower molds, the molds and the glass blank are heated and pressed for press molding the glass blank to obtain an optical glass element.

In the prior art molding apparatus, high frequency induction heating has been used as the heating means of the molds and the glass blank as disclosed in Japanese Laid-Open Patent Publication Nos. 170228/1988 and 45734/1989.

The high frequency induction heating accompanies a problem of penetration depth so that only the surface portion of a portion to be heated made of metal which constitutes a portion of the molds is heated. For this reason, it is difficult to uniformly heat the molds. Especially, where the molds are large, a problem occurs when a high frequency induction coil is disposed around the outer periphery of the molds for heating them.

We have proposed to heat the molds and glass blank by infrared ray lamps as disclosed in Japanese Patent Application No. 407118/1990 obtain more uniform heating than the high frequency induction heating.

As a result of our various researches regarding the heating of the infrared ray lamps, we have found that either, one of the molds displaces during the press molding operation, or the size of the glass blank of the optical glass element to be molded changes due to the change of the relative position of the molds and the infrared ray lamps. Therefore it is difficult to obtain an accurate temperature control of the upper and lower molds.

Depending upon the configuration of the optical glass element it is preferable to maintain a temperature difference between the upper and lower molds while increasing or decreasing the temperature of those molds or while pressing the molds. Therefore, we have found that it is necessary to accurately control the temperature of the upper and lower molds in order to accurately mold the optical glass element.

SUMMARY OF THE INVENTION

It is an object of this invention to provide a novel method and apparatus capable of molding an optical glass element at a high accuracy which is not influenced by the relative position between infrared ray lamps and the molds, or the size and the configuration of the optical glass element.

According to one aspect of this invention there is provided a method of molding an optical glass element comprising the steps of disposing a glass blank between upper and lower molds, heating the molds and the glass blank with infrared ray lamps, press molding the glass blank, detecting the temperature of the upper and lower molds to output a signal, and independently controlling electrical inputs to the infrared ray lamps respectively corresponding to the upper and lower molds such that the temperatures of the upper and lower molds would become predetermined temperatures.

According to another aspect of this invention there is provided an apparatus for molding an optical glass element comprising upper and lower molds, a mechanism for moving in the vertical direction at least one of the molds, a plurality of infrared ray lamps surrounding the upper and lower mold and a glass bland interposed between the upper and lower molds, a mechanism for detecting the temperatures of the upper and lower molds, and control assembly responsive to the output of the temperature detecting means for controlling electrical inputs to the infrared ray lamps corresponding to the upper and lower molds such that the output of the temperature detecting mechanism means would have a predetermined value.

DESCRIPTION OF THE PREFERRED EMBODIMENT

Figure 1:
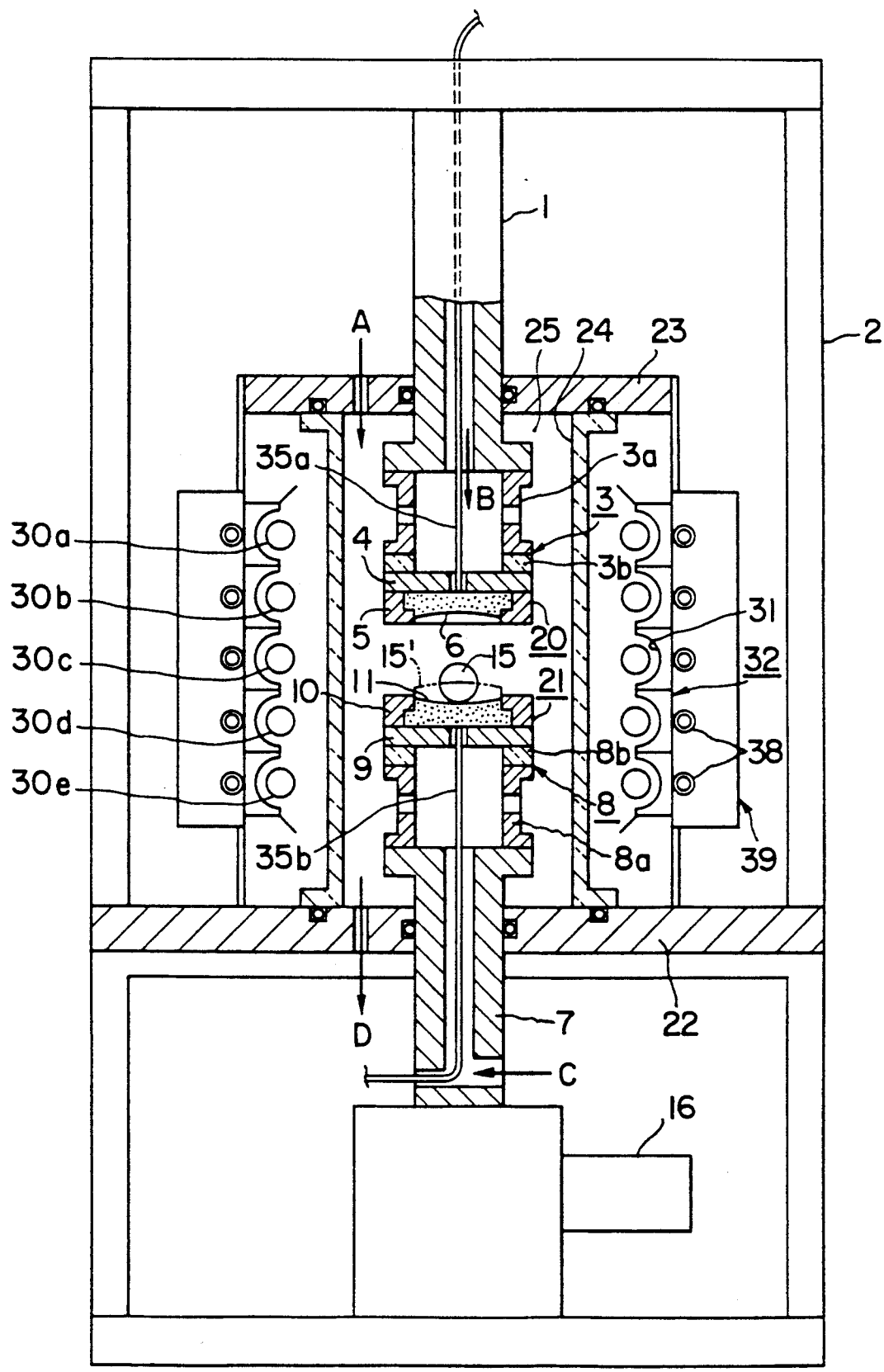
FIG. 1 is a vertical sectional view showing one embodiment of the molding apparatus of an optical glass element constructed according to this invention.

A preferred embodiment of this invention will now be described with reference to FIG. 1, FIG. 2 and FIGS. 3a and 3b.

The upper end of a stationary shaft 1 is secured to the upper portion of a frame 2 and the lower end of shaft 1 supports a stationary die plate 4 through a heat insulating member 3.

The heat insulating member 3 is made up of both a hollow shaft member 3a made of such heat insulating material as a ceramic of $Si_3N_4$, and a ring shaped member 3b made of heat insulating material which transmits infrared rays, for example transparent quartz. The stationary die plate 4 is secured by bolts, not shown. The stationary die plate 4 supports a stationary die 5 and an upper concave die 6 made of ceramic.

Beneath the stationary shaft 1 is provided a movable shaft 7 coaxial with the stationary shaft 1. In the same manner as above described, a movable die plate 9 is secured to the upper end of the movable shaft 7 through a hollow shaft member 8a and a ring shaped member 8b, both constituting a heat insulating member 8. A movable die 10 and a lower concave die 11 made of ceramic are secured to the movable die plate 9.

The movable shaft 7 extends downwardly through a base 22 and is moved in the vertical direction at a desired speed by a servomotor 16 and is arranged to stop at a desired position.

A circular plate 23 movable in the vertical direction by a driving device, not shown, is secured to the stationary shaft 1. The circular plate 23 is used to support a hollow cylinder shaped barrier 24 made of such transparent material that transmits infrared rays as transparent quartz glass.

The barrier 24 surrounds an upper die 20 including an assembly of the stationary die plate 4, a stationary die 5 and an upper concave die 6, and a lower die including an assembly of the movable die plate 9, the movable die 10 and a lower concave die 11, and by the vertical movement of the circular plate 23, a molding chamber 25 which can be opened and closed is defined between the circular plate 23 and the base 22.

The circular plate 23 supports a infrared ray lamp unit 32 comprising a plurality of annular infrared ray lamps 30a, 30b, 30c, 30d and 30e which act as a heating source and a reflecting mirror 31 surrounding the back surface of the infrared ray lamps, the reflecting mirror being prepared by grinding an aluminum plate and then plated with gold.

Figure 2:
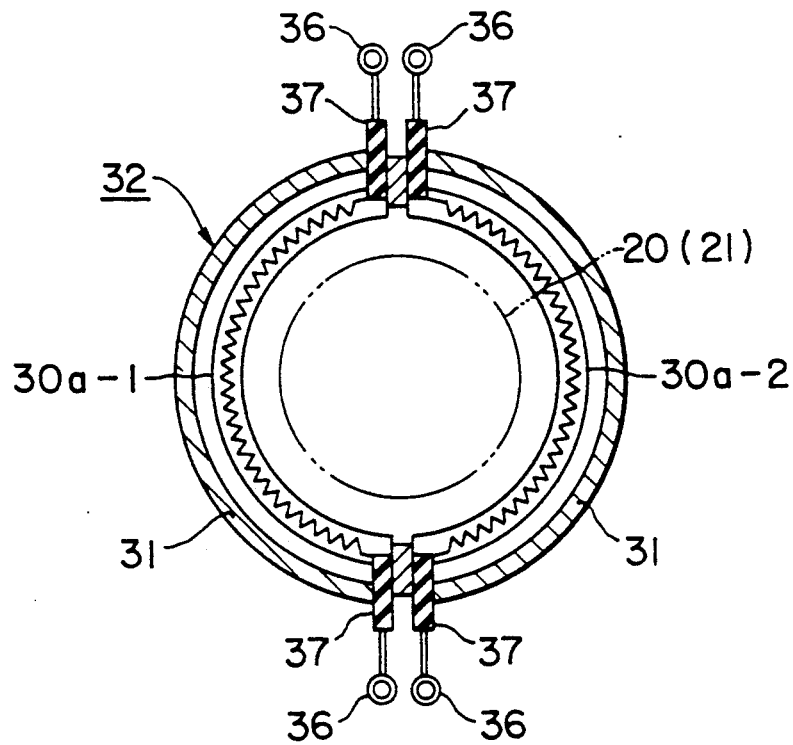
FIG. 2 is a cross-sectional view showing an infrared ray lamp unit.

In this embodiment, as shown in FIG. 2, the infrared ray lamp 30a is constructed by two semicircular infrared ray lamps $30_{a-1}$ and $30_{a-2}$ which are assembled to have substantially circular shape. Other lamps have similar construction. In FIG. 2, reference numerals 36 denotes terminals of the infrared ray lamps and 37 denote insulating bushings.

As shown in FIG. 1, on the outside of the infrared ray lamp unit 32 is disposed a cooling unit 39 wherein a water cooling pipe 38 is arranged on the back surface of the reflecting mirror 31. As a consequence, it is possible to prevent damage caused by overheating of the infrared ray lamps 30a–30e and the reflecting mirror 31.

Each of the infrared ray lamps 30a–30e is a halogen lamp including a helical filament made of tungsten. Although the wavelength range of the lamp is wide, its peak wavelength lies in a range of 1.2–1.8 μm. The infrared rays having such wavelength transmits more than 90% through the barrier 24 made of transparent quartz glass and ring shaped members 3b and 8b.

In FIG. 1, the infrared ray lamps 30a and 30b constituting upper two stages correspond to the upper die 20, whereas the infrared ray lamps 30a, 30d and 30e constituting the lower three stages corresponds to the lower die 21.

On the back surfaces of the upper concave die 6 and the lower concave die 11 are mounted thermocouples 35a and 35b respectively which act as temperature detectors.

Figure 3A:
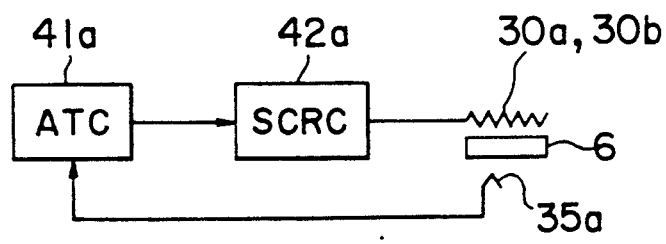
FIGS. 3a and 3b are connection diagrams showing temperature control systems.
Figure 3B:
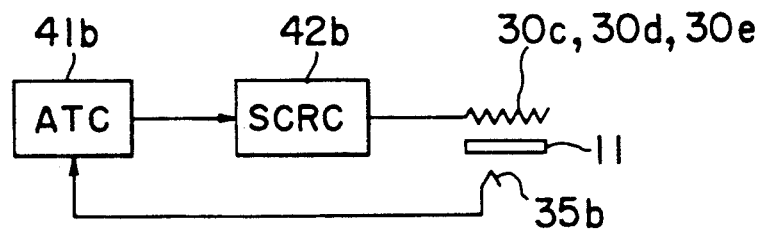

FIGS. 3a and 3b show temperature control systems for the upper and lower dies 20 and 21. 41a shows an automatic temperature controller (ATC) for the upper die, whereas 41b denotes the ATC for the lower die. These ATCs operate to set desired temperatures.

The detected outputs of the thermocouples 35a and 35b are supplied to ATCs 41a and 41b respectively and then applied to thyristor type power controllers (SCRC) 42a and 42b so as to establish set temperatures for the concave dies 6 and 11, that is upper and lower dies so as to control the inputs to infrared ray lamps 30a, 30b and 30c, 30d, 30e.

The operation of the apparatus of this invention will now be described together with the method of molding an optical glass element. This embodiment shows a case of molding a convex lens having an outer diameter of 33 mm. The outer diameters of the stationary and movable dies 5 and 10 are about 72 mm. The barrier 24 has an outer diameter of 98 mm, and a wall thickness of 4 mm. Each of the infrared ray lamps 30a–30e has a rating of 200V and maximum power of 1.7 KW. On one side the lamps are arranged in 5 stages. In other words, a total of 10 lamps are used.

The stationary die 5 and the movable die 10 are made of a tungsten alloy, both concave dies 6 and 11 are made of SiC, and the glass element 15 is made of optical glass having a maximum yielding temperature of about 650° C.

As shown in FIG. 1, a glass blank 15 (preformed) is mounted on the lower concave die 11. Then the molding chamber 25 is closed as shown in FIG. 1. Then inert gas $N_2$ is admitted into the molding chamber 25 as shown by arrows A, B and C. At the same time the inert gas is exhausted as shown by an arrow D so as to reduce the oxygen concentration in the molding chamber 25 to a degree not to affect the quality of the glass element. Thereafter, the heating is commenced.

620° C. was set for ATCs 41a and 41b shown in FIGS. 3a and 3b. The temperature is raised such that 620° C. is reached in 3 minutes. Thereafter, the temperature is held at 620° C. Meanwhile, the movable shaft 7 is raised by servomotor 16 for closely contacting the movable die 10 against the stationary die 15, thereby molding a convex lens 15'.

The temperature difference between the upper and lower dies, that is both concave dies 6 and 11 is controlled to be about ±1° C. during an interval in which the lower mold 21 is raised to a press molding state from the lower position shown in FIG. 1. With this control, an excellent convex lens 15 is obtained.

In the embodiment described above an example was described in which a control was made such that the upper and lower dies will have the same temperature. But where the configuration of the optical glass element is unsymmetrical in the upper and lower portions, the temperatures of the upper and lower molds 20 and 21 are made different, and the temperature is increased and decreased such that the heating of the glass element 11 and the cooling after molding would balance with each other as a whole. Under these conditions, an excellent optical glass element can be obtained having a small optical strain and a small shrinkage strain.

The number of the infrared ray lamps is not limited to 10, but can be increased or decreased depending upon the type of the glass blank, size of the optical glass element to be molded, etc. Further, it should be understood that the temperature detector is not limited to a thermocouple and that a radiation thermometer or the like can be used. In this embodiment, the infrared ray lamps was divided into two groups respectively including 4 and 6 lamps, it is preferable to use a single phase AC source for the group including four lamps and to use a three phase AC source for the group including 6 lamps. Further, the upper and lower groups are constructed to respectively include 6 lamps, a multiple of three, the control can be made readily by using a three phase AC source.

As above described, according to this invention, it is possible to mold an optical glass element of a high accuracy not influenced by the size and configuration of the optical glass element, the relative position of the infrared ray lamps and the mold. Furthermore, according to this invention, an optical glass element unsymmetrical in the upper and lower portion can be readily molded.

What is claimed is:

1. An apparatus for molding an optical glass element comprising:
   a molding structure which includes upper and lower molds;
   means for moving in a vertical direction at least one of said molds;
   a plurality of infrared ray lamps which are surrounding said molding structure for heating said molding structure and a glass blank interposed between said upper and lower molds;
   means for generating an output which is based on the temperature of said upper and lower molds; and
   control means for controlling the temperature of said molding structure by adjusting electrical inputs to said infrared ray lamps on the basis of said output temperature of the temperature detecting means.

2. An apparatus for molding an optical glass element which comprising:
   a molding structure which includes upper and lower molds;
   means for moving in a vertical direction at least one of said molds;
   a plurality of infrared ray lamps which are surrounding said molding structure disposed between said upper and lower molds for providing heat to said molding structure and a glass blank;
   means for generating an output which is based on the temperatures of said upper and lower molds;
   control means for controlling the temperature of said molding structure by adjusting electrical inputs to said infrared ray lamps on the basis of said output temperature of the temperature detecting means;
   a molding chamber including a cylindrical barrier which surrounds the molding structure and is surrounded by the infrared ray lamps, where said cylindrical barrier is made of an infrared ray transmitting material; and
   a cooling unit for cooling said infrared ray lamps.

3. The apparatus according to claim 2 further comprising means for admitting into and discharging from said molding chamber in inert gas.

4. The apparatus according to claim 1, wherein said control means comprises both automatic temperature control means for setting a desired temperature level and for receiving the output of said temperature detecting means, and semiconductor control means for controlling said electrical input to said infrared ray lamp.

* * * * *